United States Patent
Kwak et al.

(10) Patent No.: US 12,459,329 B2
(45) Date of Patent: Nov. 4, 2025

(54) THERMAL MANAGEMENT SYSTEM, CONTROL METHOD THEREFOR, AND COMPRESSOR INCLUDED THEREIN

(71) Applicant: Hanon Systems, Daejeon (KR)

(72) Inventors: Jung Myung Kwak, Daejeon (KR); Yong Hee Kim, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 106 days.

(21) Appl. No.: 18/547,159

(22) PCT Filed: Mar. 22, 2022

(86) PCT No.: PCT/KR2022/003942
§ 371 (c)(1),
(2) Date: Aug. 20, 2023

(87) PCT Pub. No.: WO2022/211342
PCT Pub. Date: Oct. 6, 2022

(65) Prior Publication Data
US 2024/0123790 A1    Apr. 18, 2024

(30) Foreign Application Priority Data

Apr. 2, 2021 (KR) .................. 10-2021-0043587

(51) Int. Cl.
*B60H 1/00* (2006.01)
*B60H 1/32* (2006.01)
*F04C 18/02* (2006.01)

(52) U.S. Cl.
CPC ..... *B60H 1/00278* (2013.01); *B60H 1/00978* (2013.01); *B60H 1/00985* (2013.01);
(Continued)

(58) Field of Classification Search
CPC .......... B60H 1/00278; B60H 1/00978; B60H 1/00985; B60H 1/3205; B60H 2001/325;
(Continued)

(56) References Cited

U.S. PATENT DOCUMENTS 3,765,191 A * 10/1973 Canter .................. F25B 49/005
  337/99
2020/0284257 A1 * 9/2020 Park ...................... F04C 23/008

FOREIGN PATENT DOCUMENTS

JP    H11334356 A    12/1999
JP    5245575 B2    7/2013
(Continued)

*Primary Examiner* — Marc E Norman
(74) *Attorney, Agent, or Firm* — Shumaker, Loop & Kendrick, LLP; James D. Miller (57) ABSTRACT

A thermal management system, a method of controlling the same, a compressor included in the same in which the thermal management system and the method of controlling the thermal management system determine whether the current state is a low-refrigerant state in which a refrigerant amount is smaller than a reference refrigerant amount on the basis of a degree of superheat or a degree of supercooling detected from a pressure and temperature of a refrigerant when a battery thermal management mode is operated and operations of cooling and heating a vehicle interior do not operate. The compressor is included in the thermal management system and configured as an electric compressor configured to be controlled by the control method. Therefore, it is possible to easily recognize whether the current state is the low-refrigerant state in which the refrigerant amount is smaller than the reference refrigerant amount.

14 Claims, 8 Drawing Sheets

(52) U.S. Cl.
CPC ..... *B60H 1/3205* (2013.01); *B60H 2001/325* (2013.01); *B60H 2001/3257* (2013.01); *F04C 18/0215* (2013.01)

(58) Field of Classification Search
CPC .... B60H 2001/3252; B60H 2001/3257; B60H 2001/3261; F25B 2600/15; F25B 2700/04; F04C 18/0215
See application file for complete search history.

(56) References Cited

FOREIGN PATENT DOCUMENTS

| | | | |
|---|---|---|---|
| JP | 2018035979 | A | 3/2018 |
| KR | 20160066180 | A | 6/2016 |
| WO | 2020071801 | A1 | 4/2020 |

\* cited by examiner

FIG. 8 ial phase patent
THERMAL MANAGEMENT SYSTEM, CONTROL METHOD THEREFOR, AND COMPRESSOR INCLUDED THEREIN

CROSS-REFERENCE TO RELATED APPLICATIONS

This application is a United States national phase patent application based on PCT/KR2022/003942 filed on Mar. 22, 2022, which claims the benefit of Korean Patent Application No. 10-2021-0043587 filed on Apr. 2, 2021, the entire disclosures of which are hereby incorporated herein by reference.

TECHNICAL FIELD

The present invention relates to a thermal management system, a method of controlling the same, and a compressor included in the same, and more particularly, to a thermal management system, a method of controlling the same, and a compressor included in the same, the thermal management system being capable of determining whether the current state is a low-refrigerant state in which a refrigerant amount is smaller than a reference refrigerant amount, and taking action when the determination result indicates that the current state is the low-refrigerant state.

BACKGROUND ART

In general, a vehicle includes a thermal management system including a compressor configured to compress a refrigerant to condition air and manage heat of a battery, a first heat exchanger configured to cool the refrigerant compressed by the compressor, an expansion means configured to expand the refrigerant cooled by the first heat exchanger, and a second heat exchanger configured to allow the refrigerant, which is expanded by the expansion means, to exchange heat with a coolant in a coolant circuit having a battery heat exchanger.

However, in the case of a thermal management system in the related art, it is difficult to recognize whether the current state is a low-refrigerant state in which a refrigerant amount is smaller than a reference refrigerant amount, and the thermal management system continuously operates even in the low-refrigerant state, which causes various problems (an increase in displeasure because of an appropriate supply of cooling and heating to a passenger compartment, difficulty in ensuring a visual field because of a deterioration in dehumidification function, an increase in charging time because of insufficient cooling of a battery, a decrease in traveling distance of a vehicle using electric power, and damage to the compressor caused by the insufficient amount of oil contained in the refrigerant). Meanwhile, technologies for recognizing a lack of amount of refrigerant in the compressor have been disclosed in some documents of the related art. However, because these technologies have been made without considering actual vehicle conditions with many variables such as an outside air temperature, a user control condition, whether a vehicle door is opened, and whether a window is opened, it is difficult to recognize an accurate refrigerant amount, and the technologies cannot be applied to actual vehicles.

SUMMARY

Accordingly, an object of the present invention is to provide a thermal management system, a method of controlling the same, and a compressor included in the same, the thermal management system being capable of easily recognizing whether the current state is a low-refrigerant state in which a refrigerant amount is smaller than a reference refrigerant amount, and taking action when the determination result indicates that the current state is the low-refrigerant state, thereby preventing various problems.

To achieve the above-mentioned object, the present invention provides a thermal management system including: a coolant circuit having a circulating coolant, and a battery heat exchanger configured to allow the coolant to exchange heat with a battery of a vehicle; a refrigerant circuit including a compressor configured to compress a refrigerant, a first heat exchanger configured to cool the refrigerant compressed by the compressor, an expansion means configured to expand the refrigerant cooled by the first heat exchanger, and a second heat exchanger configured to allow the refrigerant, which is expanded by the expansion means, to exchange heat with the coolant; a measurement means configured to measure a pressure and temperature of the refrigerant; and a controller configured to determine whether a battery thermal management mode operates in which the coolant circuit and the refrigerant circuit are operated and operations of cooling and heating an interior of the vehicle do not operate, detect a degree of superheat or a degree of supercooling of the refrigerant from the pressure and temperature of the refrigerant measured by the measurement means, and determine whether the current state is a low-refrigerant state in which a refrigerant amount in the compressor is smaller than a reference refrigerant amount.

The controller may be configured to determine whether the current state is the low-refrigerant state when the battery thermal management mode is operated under a condition in which the operations of cooling and heating the interior of the vehicle do not operate.

The controller may be configured to determine whether the current state is the low-refrigerant state when a first reference time has elapsed after initiating an operation of the compressor.

The controller may be configured to detect the degree of superheat from the pressure and temperature of the refrigerant introduced into the compressor and determine that the current state is the low-refrigerant state when the degree of superheat is a first reference temperature or higher.

The controller may be configured to detect the degree of supercooling from the pressure and temperature of the refrigerant introduced into the expansion means and determine that the current state is the low-refrigerant state when a state in which the degree of supercooling is a second reference temperature or less is maintained for a second reference time or more.

The controller may be configured to restrict at least one of a maximum rotational speed and an increase/decrease rate of a rotational speed of the compressor when the controller determines that the current state is the low-refrigerant state.

The controller may be configured to raise an alarm when the controller determines that the current state is the low-refrigerant state.

Further, the present invention provides a method of controlling a thermal management system, the method including: a first determination step of determining whether the thermal management system operates in the battery thermal management mode; a second determination step of determining whether a first reference time has elapsed after initiating an operation of the compressor; a third determination step of comparing the degree of superheat or the degree of supercooling with a reference temperature; and a fourth determination step of determining whether the current state is the low-refrigerant state on the basis of determination results in the first determination step, the second determination step, and the third determination step.

The third determination step may determine whether the degree of superheat detected from the pressure and temperature of the refrigerant introduced into the compressor is a first reference temperature or higher, and the fourth determination step may determine that the current state is the low-refrigerant state when the determination result in the first determination step indicates that the thermal management system operates in the battery thermal management mode, the determination result in the second determination step indicates that the first reference time has elapsed after initiating the operation of the compressor, and the determination result in the third determination step indicates that the degree of superheat is the first reference temperature or higher.

The third determination step may determine whether the degree of supercooling detected from the pressure and temperature of the refrigerant introduced into the expansion means is a second reference temperature or lower and whether a state in which the degree of supercooling is the second reference temperature or lower is maintained for a second reference time or more, and the fourth determination step may determine that the current state is the low-refrigerant state when the determination result in the first determination step indicates that the thermal management system operates in the battery thermal management mode, the determination result in the second determination step indicates that the first reference time has elapsed after initiating an operation of the compressor, and the determination result in the third determination step indicates that the state in which the degree of supercooling is the second reference temperature or lower is maintained for the second reference time or more.

The second determination step may be performed when the determination result in the first determination step indicates that the thermal management system operates in the battery thermal management mode, and the third determination step may be performed when the determination result in the second determination step indicates that the first reference time has elapsed after initiating the operation of the compressor.

The method may further include: a compressor control step of restricting at least one of a maximum rotational speed and an increase/decrease rate of a rotational speed of the compressor when the determination result in the fourth determination step indicates that the current state is the low-refrigerant state.

The method may further include: an alarm step of raising an alarm when the determination result in the fourth determination step indicates that the current state is the low-refrigerant state.

Further, the present invention provides a compressor including: a motor configured to generate power; a rotary shaft configured to be rotated by the motor; an orbiting scroll configured to be rotated by the rotary shaft; and a fixed scroll define a compression chamber together with the orbiting scroll, in which the compressor is included in the thermal management system.

According to the thermal management system, the method of controlling the same, the compressor included in the same according to the present invention, the thermal management system and the method of controlling the thermal management system determine whether the current state is the low-refrigerant state in which the refrigerant amount is smaller than the reference refrigerant amount on the basis of the degree of superheat or the degree of supercooling detected from the pressure and temperature of the refrigerant when the battery thermal management mode is operated and the operations of cooling and heating the vehicle interior do not operate. The compressor is included in the thermal management system and configured as an electric compressor configured to be controlled by the control method. Therefore, it is possible to easily recognize whether the current state is the low-refrigerant state in which the refrigerant amount is smaller than the reference refrigerant amount, and to take action when the current state is the low-refrigerant state. Therefore, it is possible to prevent various problems (an increase in displeasure because of an appropriate supply of cooling and heating to a passenger compartment, difficulty in ensuring a visual field because of a deterioration in dehumidification function, an increase in charging time because of insufficient cooling of a battery, a decrease in traveling distance of a vehicle using electric power, and damage to the compressor caused by the insufficient amount of oil contained in the refrigerant).

DESCRIPTION OF AN EMBODIMENT OF THE DISCLOSURE

Hereinafter, a method of controlling a thermal management system and an electric compressor configured to be controlled by the method according to the present invention will be described in detail with reference to the accompanying drawings.

Figure 1:
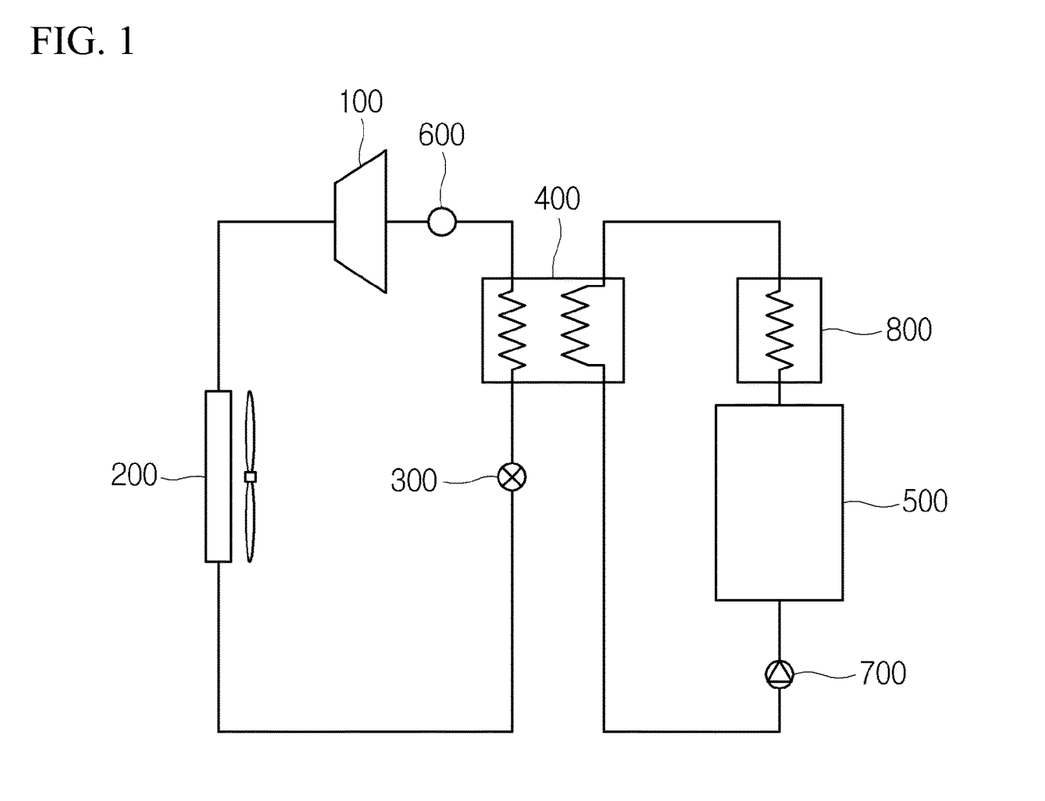
FIG. 1 is a system diagram illustrating a thermal management system according to an embodiment of the present invention.
Figure 2:
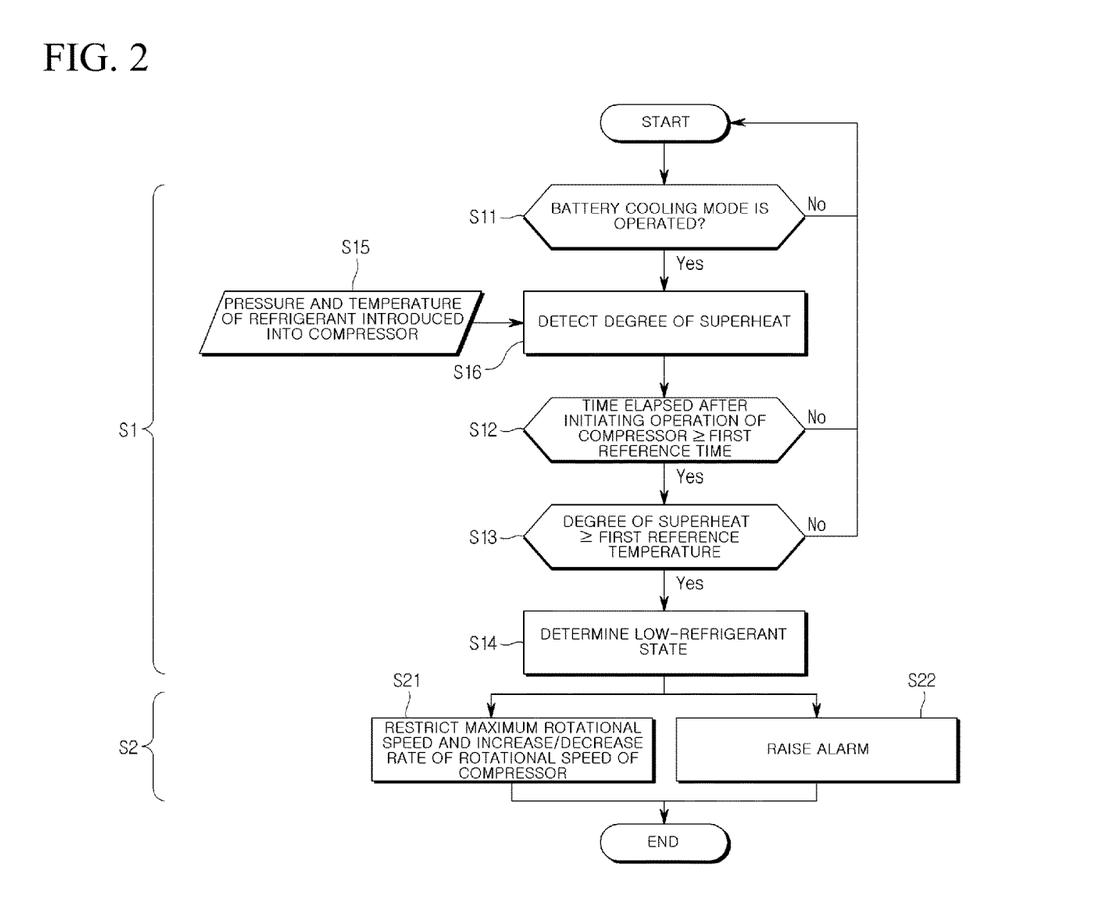
FIG. 2 is a flowchart illustrating a method of controlling the thermal management system in FIG. 1.
Figure 3:
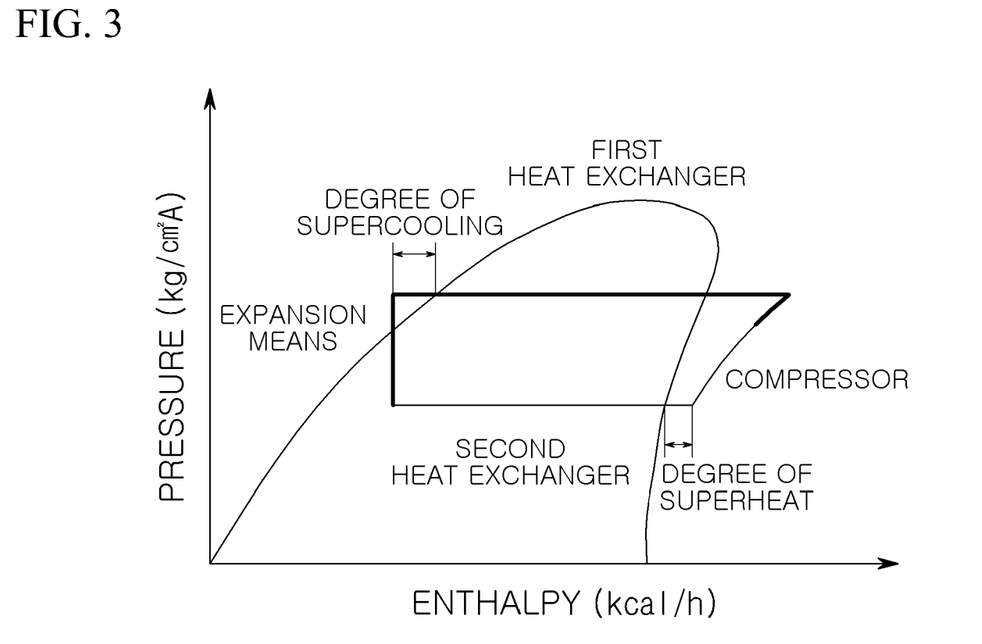
FIG. 3 is a p-h diagram of a refrigerant circuit in the thermal management system in FIG. 1.
Figure 4:
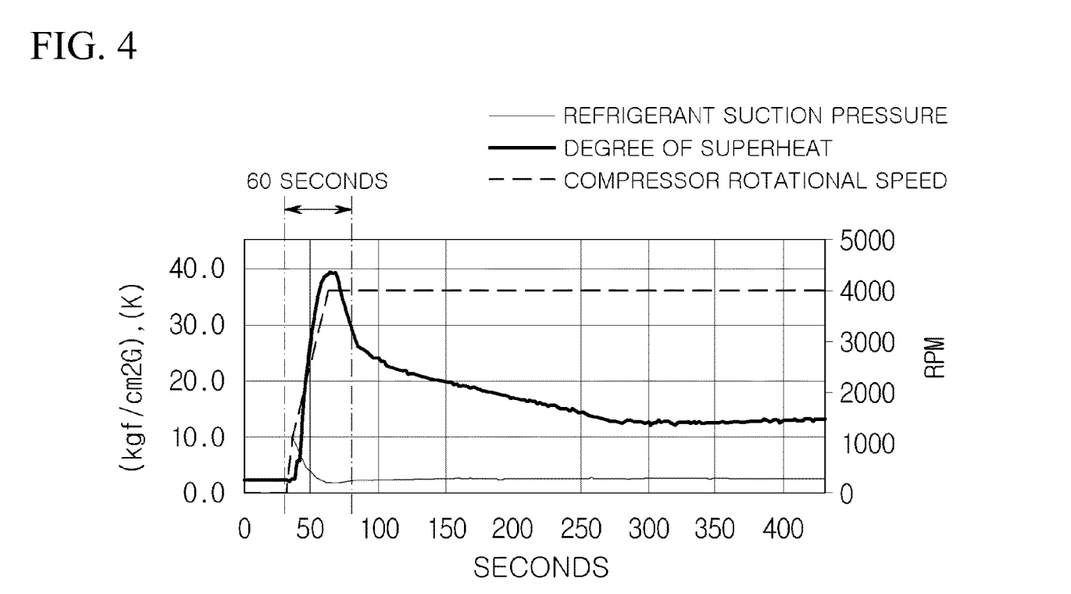
FIG. 4 is a graph showing a change in degree of superheat in accordance with an operation of a compressor when a refrigerant amount is a reference refrigerant amount in the thermal management system in FIG. 1.
Figure 5:
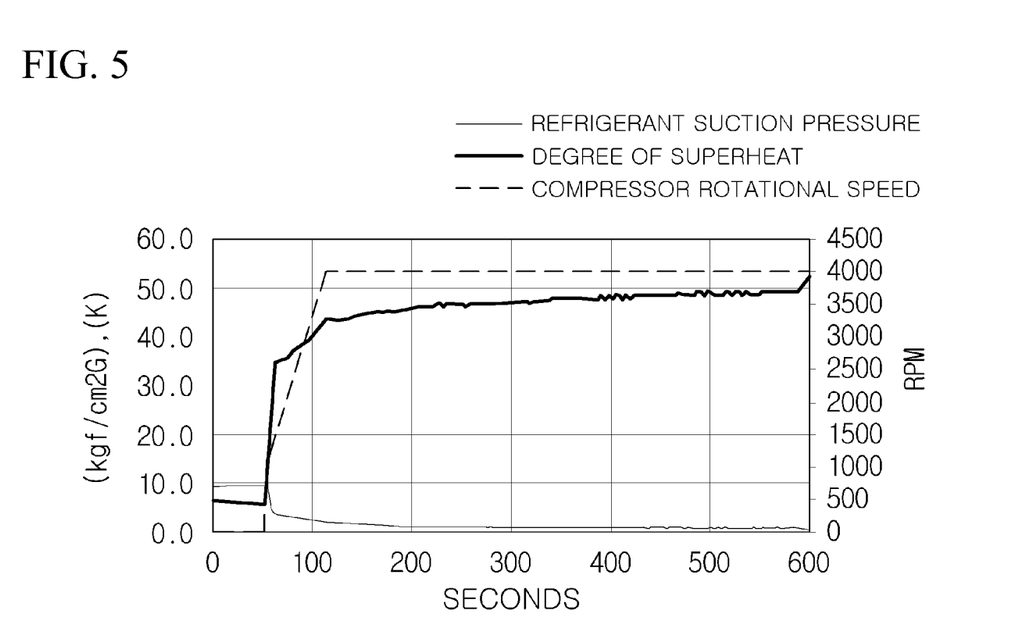
FIG. 5 is a graph showing a change in degree of superheat in accordance with an operation of the compressor when the refrigerant amount is smaller than the reference refrigerant amount in the thermal management system in FIG. 1.
Figure 6:
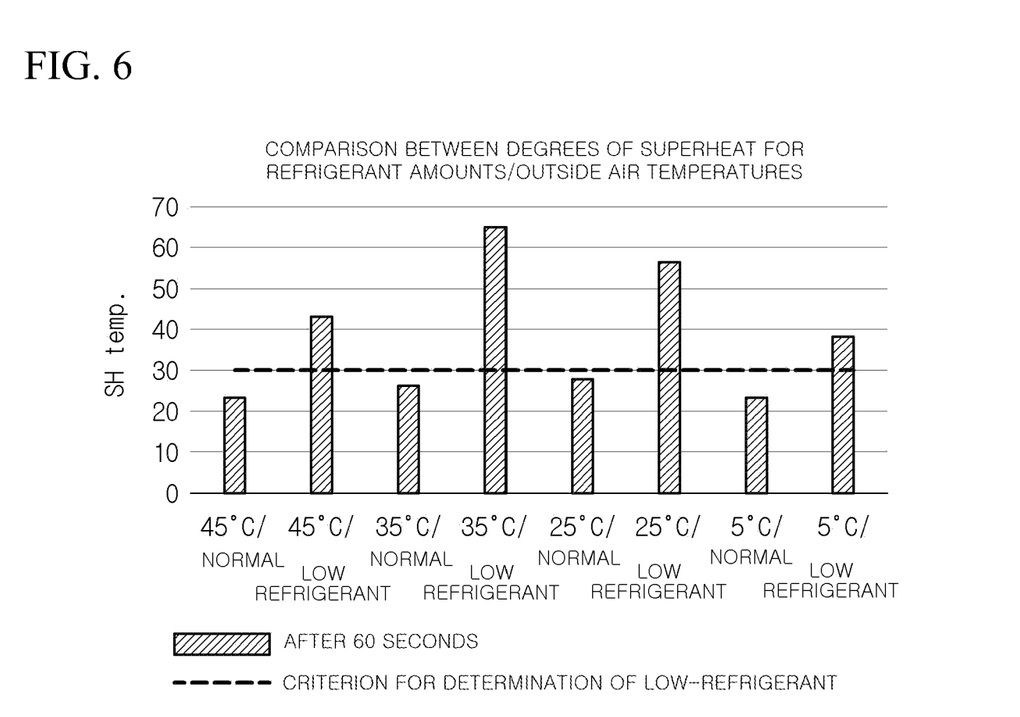
FIG. 6 is a graph showing a comparison between degrees of superheat for respective refrigerant amounts/outside air temperatures in the thermal management system in FIG. 1.

FIG. 1 is a system diagram illustrating a thermal management system according to an embodiment of the present invention, FIG. 2 is a flowchart illustrating a method of controlling the thermal management system in FIG. 1, FIG. 3 is a p-h diagram of a refrigerant circuit in the thermal management system in FIG. 1, FIG. 4 is a graph showing a change in degree of superheat in accordance with an operation of a compressor when a refrigerant amount is a reference refrigerant amount in the thermal management system in FIG. 1, FIG. 5 is a graph showing a change in degree of superheat in accordance with an operation of the compressor when the refrigerant amount is smaller than the reference refrigerant amount in the thermal management system in FIG. 1, and FIG. 6 is a graph showing a comparison between degrees of superheat for respective refrigerant amounts/outside air temperatures in the thermal management system in FIG. 1.

With reference to FIG. 1, a vehicle (e.g., an electric vehicle) according to the embodiment of the present invention includes a thermal management system for conditioning air and managing heat of a battery. The thermal management system may include a refrigerant circuit, and a coolant circuit thermally coupled to the refrigerant circuit and the battery.

The refrigerant circuit may include a compressor 100 configured to compress a low-temperature, low-pressure gaseous refrigerant into a high-temperature, high-pressure gaseous refrigerant, a first heat exchanger 200 configured to cool and condense the high-temperature, high-pressure gaseous refrigerant, which is compressed by the compressor 100, into a middle-temperature, high-pressure liquid refrigerant, an expansion means or an expansion valve 300 configured to expand the middle-temperature, high-pressure liquid refrigerant, which is cooled and condensed by the first heat exchanger 200, into a low-temperature, low-pressure liquid refrigerant, and a second heat exchanger 400 configured to heat and evaporate the low-temperature, low-pressure liquid refrigerant, which is expanded by the expansion means 300, into a low-temperature, low-pressure gaseous refrigerant.

The coolant circuit may include a battery heat exchanger 500 configured to allow the battery of the vehicle to exchange heat directly or indirectly with a coolant in the coolant circuit, and the second heat exchanger 400 configured to perform heat exchange between the coolant and the refrigerant in the refrigerant circuit.

In this case, the second heat exchanger 400 may be configured as a chiller that serves as an evaporator for the refrigerant circuit while dissipating the heat of the coolant circuit to the refrigerant circuit.

Further, the refrigerant circuit may further include a separate evaporator (not illustrated) in addition to the second heat exchanger 400. Air to be supplied to the passenger compartment may flow through at least one of the first heat exchanger 200 and the separate evaporator (not illustrated).

Further, the refrigerant circuit may further include a measurement means 600 disposed between a downstream side of the second heat exchanger 400 and an upstream side of the compressor 100 and configured to measure a pressure and temperature of the refrigerant introduced into the compressor 100.

The measurement means 600 may include a pressure sensor and a temperature sensor.

Further, the coolant circuit may further include a pump 700 configured to circulate the coolant in the coolant circuit.

Further, the coolant circuit may further include a heater 800 configured to transfer additional heat to the coolant.

Meanwhile, the thermal management system may be configured to be operated by a method of controlling the thermal management system according to the embodiment of the present invention, as described below.

That is, the method of controlling the thermal management system according to the present embodiment may include a determination step S1 of determining whether the current state is a low-refrigerant state in which a refrigerant amount (more accurately, the amount of refrigerant in the compressor 100) is smaller than a reference refrigerant amount, and an action step S2 of taking action when the determination result in the determination step S1 indicates that the current state is the low-refrigerant state.

The determination step S1 may include a first determination step S11 of determining whether the thermal management system operates in a reference mode, a second determination step S12 of determining whether a first reference time has elapsed after initiating the operation of the compressor 100, a measurement step S15 of measuring, by the measurement means 600, the pressure and temperature of the refrigerant introduced into the compressor 100, a detection step S16 of detecting a degree of superheat of the refrigerant from the pressure and temperature of the refrigerant measured by the measurement step S15, a third determination step S13 of determining whether the degree of superheat of the refrigerant detected by the detection step S16 is a first reference temperature or higher, and a fourth determination step S14 of determining that the current state is the low-refrigerant state when the determination result in the first determination step S11 indicates that the thermal management system operates in the reference mode, the determination result in the second determination step S12 indicates that the first reference time has elapsed after initiating the operation of the compressor 100, and the determination result in the third determination step S13 indicates that the degree of superheat is the first reference temperature or higher.

In this case, in case that cooling and heating are provided to the vehicle interior, there are many variables such as an outside air temperature, a user control condition, whether a vehicle door is opened, and whether a window is opened. However, there are fewer variables related to a use environment in a battery thermal management mode in which the refrigerant circuit and the coolant circuit are operated, but cooling and heating are not provided, and only the battery thermal management is provided (the compressor 100 operates only for the purpose of the battery thermal management). Therefore, the reference mode may be set to the battery thermal management mode with fewer variables in order to accurately determine whether the current state is the low-refrigerant state.

Further, as illustrated in FIG. 3, the degree of superheat refers to a degree to which the refrigerant is heated to a temperature higher than a saturated temperature during a process in which the refrigerant flows from the second heat exchanger 400 to the compressor 100. As illustrated in FIG. 4, in a normal state in which the refrigerant amount is the reference refrigerant amount, the degree of superheat becomes at a high level immediately after initiating the operation of the compressor 100 and then is stabilized at a low level after about 60 seconds. In contrast, as illustrated in FIG. 5, when the refrigerant amount is in the low-refrigerant state, the degree of superheat may be kept at a high level even after 60 seconds. In consideration of this situation, the first reference time may be set to 60 seconds in order to easily and accurately determine the refrigerant amount by using the degree of superheat after the stabilization.

Further, as illustrated in FIG. 6, when 60 seconds elapse after initiating the operation of the compressor 100 in case that the refrigerant amount is in the normal state, the degree of superheat is lower than 30 degrees (K). In contrast, when 60 seconds elapse after initiating the operation of the compressor 100 in case that the refrigerant amount is in a low-flow rate state, the degree of superheat is 30 degrees (K) or higher. Therefore, in consideration of this situation, the first reference temperature may be set to 30 degrees (K).

The action step S2 may include a compressor control step S21 of restricting at least one of a maximum rotational speed and an increase/decrease rate of a rotational speed of the compressor 100 when the determination result in the fourth determination step S14 indicates that the current state is the low-refrigerant state, and an alarm step S22 of raising an alarm (e.g., a diagnosis code).

Further, the thermal management system may include a controller configured to implement the method of controlling the thermal management system.

That is, the controller may be configured to determine whether the battery thermal management mode is operated, detect the degree of superheat, and determine whether the current state is the low-refrigerant state. In this case, the controller may be configured to determine whether the current state is the low-refrigerant state when the battery thermal management mode is operated. Further, the controller may be configured to determine whether the current state is the low-refrigerant state when the first reference time has elapsed after initiating the operation of the compressor 100. Further, the controller may be configured to detect the degree of superheat from the pressure and temperature of the refrigerant introduced into the compressor 100 and determine that the current state is the low-refrigerant state when the degree of superheat is the first reference temperature or higher.

Further, the controller may be configured to restrict at least one of the maximum rotational speed and the increase/decrease rate of a rotational speed of the compressor 100 when the controller determines that the current state is the low-refrigerant state.

Further, the controller may be configured to raise an alarm when the controller determines that the current state is the low-refrigerant state.

In this case, the controller may be an ECU for a vehicle, an air conditioning controller (thermal control unit) for a vehicle, or the like.

Meanwhile, the compressor 100 may be configured as an electric compressor including a motor configured to generate power, a rotary shaft configured to be rotated by the motor, an orbiting scroll configured to be rotated by the rotary shaft, and a fixed scroll configured to define a compression chamber together with the orbiting scroll. The motor is controlled by the method of controlling the thermal management system in order to immediately and accurately react when the compressor control step S21 is performed.

Hereinafter, an operational effect according to the present embodiment will be described.

That is, the thermal management system and the method of controlling the thermal management system according to the present embodiment include the first determination step S11, i.e., determine the refrigerant amount in the compressor 100 when the thermal management system operates in the battery thermal management mode, such that the number of variables related to the use environment decreases, which makes it possible to easily and accurately recognize whether the refrigerant amount in the compressor 100 is in the low-refrigerant state.

Further, the thermal management system and the method of controlling the thermal management system according to the present embodiment include the second determination step S12, i.e., determine the refrigerant amount in the compressor 100 in the state in which the first reference time has elapsed after initiating the operation of the compressor 100 after the stabilization, which makes it possible to more accurately recognize whether the refrigerant amount in the compressor 100 is in the low-refrigerant state.

Further, the thermal management system and the method of controlling the thermal management system according to the present embodiment include the third determination step S13, i.e., determine the refrigerant amount in the compressor 100 by using the degree of superheat that is easily calculated from the pressure and temperature of the refrigerant and clearly distinguished in difference in accordance with the refrigerant amount in the compressor 100, which makes it possible to easily and accurately recognize whether the refrigerant amount in the compressor 100 is in the low-refrigerant state.

Further, the thermal management system and the method of controlling the thermal management system according to the present embodiment include the fourth determination step S14, i.e., determine the refrigerant amount in the compressor 100 while collectively considering the determination results in the first determination step S11, the second determination step S12, and the third determination step S13, which makes it possible to more accurately recognize whether the refrigerant amount in the compressor 100 is in the low-refrigerant state.

Further, the thermal management system and the method of controlling the thermal management system according to the present embodiment include the compressor control step S21, i.e., restrict at least one of the maximum rotational speed and the increase/decrease rate of a rotational speed of the compressor 100 when the determination result in the determination step S1 indicates that the refrigerant amount in the compressor 100 is in the low-refrigerant state, which makes it possible to suppress damage to the compressor 100 caused by a lack of oil and continuously operate the thermal management system.

Further, the thermal management system and the method of controlling the thermal management system according to the present embodiment include the alarm step S22, i.e., notify a driver of the determination result in the determination step S1 that indicates that the refrigerant amount in the compressor 100 is in the low-refrigerant state, which makes it possible to allow the driver to perform inspection and charge the vehicle with the refrigerant and oil.

Further, the compressor 100 according to the present embodiment is configured as an electric compressor, which makes it possible to allow the compressor 100 immediately and accurately react when the compressor control step S21 is performed. Therefore, it is possible to effectively suppress damage to the compressor 100.

Meanwhile, in the present embodiment, to perform the efficient operation, the second determination step S12 is performed only when the determination result in the first determination step S11 indicates that the thermal management system operates in the battery thermal management mode, the third determination step S13 is performed only when the determination result in the second determination step S12 indicates that the first reference time has elapsed after initiating the operation of the compressor 100, and the fourth determination step S14 is performed only when the determination result in the third determination step S13 indicates that the degree of superheat is the first reference temperature or higher. In this case, the process returns to the start step when the determination result in the first determination step S11 indicates that the thermal management system does not operate in the battery thermal management mode, the determination result in the second determination step S12 indicates that the first reference time has not elapsed after initiating the operation of the compressor 100, or the determination result in the third determination step S13 indicates that the degree of superheat is lower than the first reference temperature. However, the present invention is not limited thereto. That is, the order of the first determination step S11, the second determination step S12, and the third determination step S13 may be adjusted. Alternatively, the first determination step S11, the second determination step S12, and the third determination step S13 may be performed independently, the fourth determination step S14 may determine whether the refrigerant amount in the compressor 100 is in the low-refrigerant state by collectively considering the determination results in the first determination step S11, the second determination step S12, and the third determination step S13.

Meanwhile, in the present embodiment, the measurement step S15 and the detection step S16 are performed between the first determination step S11 and the second determination step S12. However, the present invention is not limited thereto. That is, the timings of the measurement step S15 and the detection step S16 may be appropriately adjusted as long as the degree of superheat detected by the detection step S16 may be used for the third determination step S13.

Meanwhile, in the present embodiment, the measurement means 600 is configured to measure the pressure and temperature of the refrigerant introduced into the compressor 100, and the method of controlling the thermal management system detects the degree of superheat from the pressure and temperature of the refrigerant introduced into the compressor 100, which are measured by the measurement means 600, and determine the refrigerant amount in the compressor 100 by using the degree of superheat. However, the present invention is not limited thereto.

Figure 7:
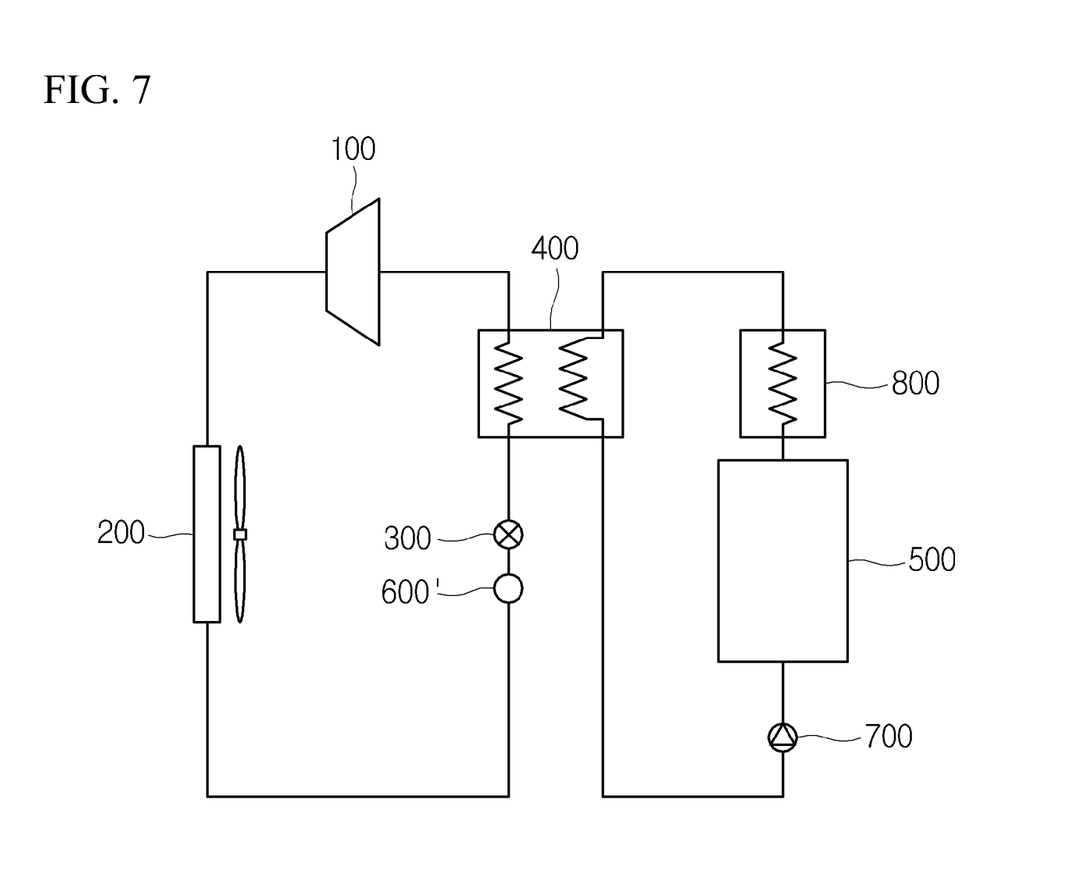
FIG. 7 is a system diagram illustrating a thermal management system according to another embodiment of the present invention.
Figure 8:
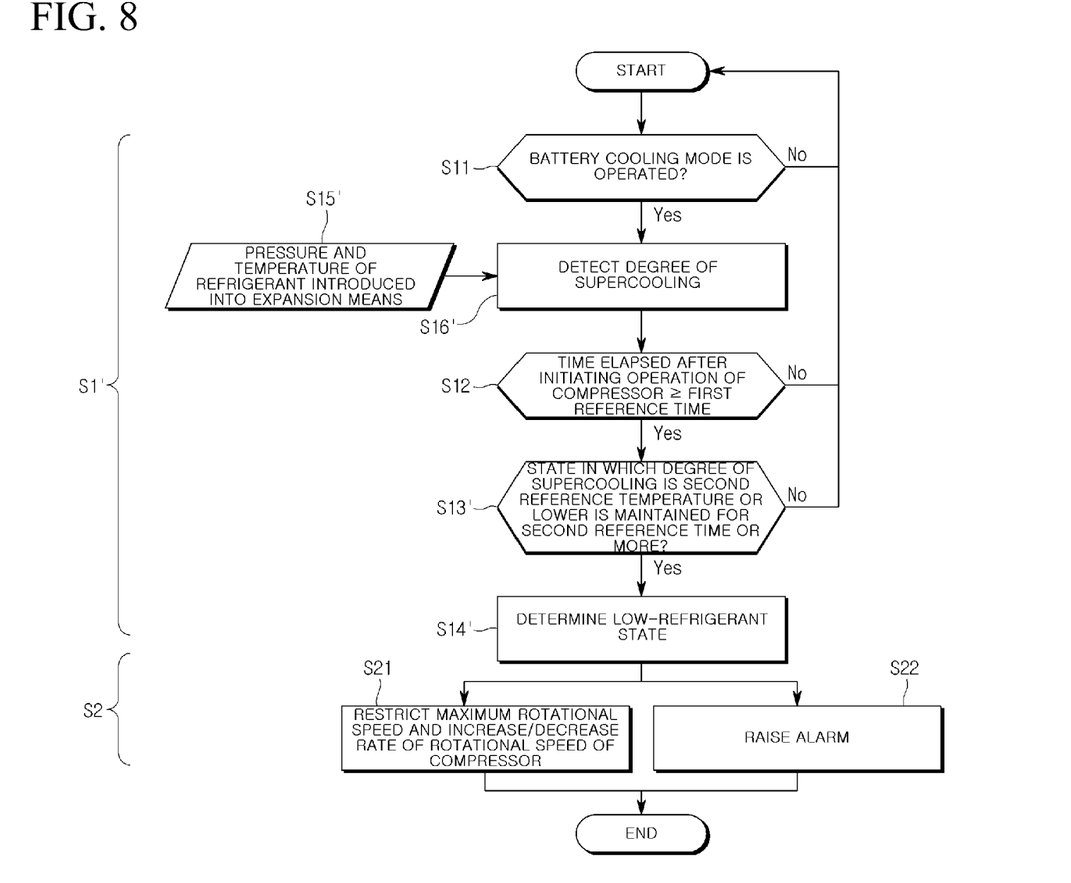
FIG. 8 is a flowchart illustrating a method of controlling the thermal management system in FIG. 7.

For example, with reference to FIGS. 7 and 8, a measurement means 600' of a thermal management system according to another embodiment of the present invention may be configured to measure the pressure and temperature of the refrigerant introduced into the expansion means 300 between the downstream side of the first heat exchanger 200 and the upstream side of the expansion means 300, and the controller and the method of controlling the thermal management system may be configured to detect a degree of supercooling (a degree to which the refrigerant is cooled to a temperature lower than a saturated condensing temperature during a process in which the refrigerant flows from the first heat exchanger 200 to the expansion means 300, as illustrated in FIG. 3) from the pressure and temperature of the refrigerant introduced into the expansion means 300, which are measured by the measurement means 600', and determine the refrigerant amount in the compressor 100 by using the degree of supercooling in a determination step S1'.

Specifically, in the thermal management system and the method of controlling the thermal management system according to another embodiment of the present invention, a measurement step S15', a detection step S16', a third determination step S13, and a fourth determination step S14', which are similar to those in the above-mentioned embodiment, may use the degree of supercooling.

That is, the measurement step S15' may be configured to measure the pressure and temperature of the refrigerant introduced into the expansion means 300.

Further, the detection step S16' may detect the degree of supercooling of the refrigerant from the pressure and temperature of the refrigerant measured in the measurement step S15'.

Further, the third determination step S13' may determine whether a state in which the detected degree of supercooling of the refrigerant is a second reference temperature or lower is maintained for a second reference time or more.

Further, the fourth determination step S14' may determine that the current state is the low-refrigerant state when the determination result in the first determination step S11 indicates that the thermal management system operates in the reference mode, the determination result in the second determination step S12 indicates that the first reference time has elapsed after initiating the operation of the compressor 100, and the determination result in the third determination step S13' indicates that the state in which the degree of supercooling is the second reference temperature or lower is maintained for the second reference time or more.

In this case, the third determination step S13' and the fourth determination step S14' do not determine whether the current state is the low-refrigerant state on the basis of whether the degree of supercooling is the second reference temperature or lower in consideration of the relationship between the low-refrigerant state and the degree of supercooling, but the third determination step S13' and the fourth determination step S14' may determine whether the current state is the low-refrigerant state on the basis of whether the state in which the degree of supercooling is the second reference temperature or lower is maintained for the second reference time or more. The second reference temperature may be set to 2 degrees (K), and the second reference time may be set to 10 seconds.

The invention claimed is:

1. A thermal management system comprising:
   a coolant circuit having a circulating coolant, and a battery heat exchanger configured to allow the coolant to exchange heat with a battery of a vehicle;
   a refrigerant circuit including a compressor configured to compress a refrigerant, a first heat exchanger configured to cool the refrigerant compressed by the compressor, an expansion valve configured to expand the refrigerant cooled by the first heat exchanger, and a second heat exchanger configured to allow the refrigerant, which is expanded by the expansion valve, to exchange heat with the coolant;
   a measurement means configured to measure a pressure and a temperature of the refrigerant; and
   a controller configured to determine whether a battery thermal management mode operates in which the coolant circuit and the refrigerant circuit are operated and operations of cooling and heating an interior of the vehicle do not operate, detect a degree of superheat or a degree of supercooling of the refrigerant from the pressure and the temperature of the refrigerant measured by the measurement means, and determine whether a current state is a low-refrigerant state in which a refrigerant amount in the compressor is smaller than a reference refrigerant amount.

2. The thermal management system of claim 1, wherein the controller is configured to determine whether the current state is the low-refrigerant state when the battery thermal management mode is operated under a condition in which the operations of cooling and heating the interior of the vehicle do not operate.

3. The thermal management system of claim 2, wherein the controller is configured to determine whether the current state is the low-refrigerant state when a first reference time has elapsed after initiating an operation of the compressor.

4. The thermal management system of claim 3, wherein the controller is configured to detect the degree of superheat from the pressure and the temperature of the refrigerant introduced into the compressor and determine that the current state is the low-refrigerant state when the degree of superheat is a first reference temperature or higher.

5. The thermal management system of claim 3, wherein the controller is configured to detect the degree of supercooling from the pressure and the temperature of the refrigerant introduced into the expansion valve and determine that the current state is the low-refrigerant state when a state in which the degree of supercooling is a second reference temperature or less is maintained for a second reference time or more.

6. The thermal management system of claim 1, wherein the controller is configured to restrict at least one of a maximum rotational speed and an increase/decrease rate of a rotational speed of the compressor when the controller determines that the current state is the low-refrigerant state.

7. The thermal management system of claim 1, wherein the controller is configured to raise an alarm when the controller determines that the current state is the low-refrigerant state.

8. A method of controlling a thermal management system comprising a coolant circuit having a circulating coolant, and a battery heat exchanger configured to allow the coolant to exchange heat with a battery of a vehicle, a refrigerant circuit including a compressor configured to compress a refrigerant, a first heat exchanger configured to cool the refrigerant compressed by the compressor, an expansion valve configured to expand the refrigerant cooled by the first heat exchanger, and a second heat exchanger configured to allow the refrigerant, which is expanded by the expansion valve, to exchange heat with the coolant, a measurement means configured to measure a pressure and a temperature of the refrigerant, and a controller configured to determine whether a battery thermal management mode operates in which the coolant circuit and the refrigerant circuit are operated and operations of cooling and heating an interior of the vehicle do not operate, detect a degree of superheat or a degree of supercooling of the refrigerant from the pressure and the temperature of the refrigerant measured by the measurement means, and determine whether a current state is a low-refrigerant state in which a refrigerant amount in the compressor is smaller than a reference refrigerant amount, the method comprising the steps of:
 a first determination step of determining whether the thermal management system operates in the battery thermal management mode;
 a second determination step of determining whether a first reference time has elapsed after initiating an operation of the compressor;
 a third determination step of comparing the degree of superheat or the degree of supercooling with a reference temperature; and
 a fourth determination step of determining whether the current state is the low-refrigerant state on a basis of a determination result in the first determination step, the second determination step, and the third determination step.

9. The method of claim 8, wherein the third determination step determines whether the degree of superheat detected from the pressure and the temperature of the refrigerant introduced into the compressor is a first reference temperature or higher, and wherein the fourth determination step determines that the current state is the low-refrigerant state when the determination result in the first determination step indicates that the thermal management system operates in the battery thermal management mode, a determination result in the second determination step indicates that the first reference time has elapsed after initiating the operation of the compressor, and a determination result in the third determination step indicates that the degree of superheat is the first reference temperature or higher.

10. The method of claim 8, wherein the third determination step determines whether the degree of supercooling detected from the pressure and the temperature of the refrigerant introduced into the expansion valve is a second reference temperature or lower and whether a state in which the degree of supercooling is the second reference temperature or lower is maintained for a second reference time or more, and wherein the fourth determination step determines that the current state is the low-refrigerant state when the determination result in the first determination step indicates that the thermal management system operates in the battery thermal management mode, a determination result in the second determination step indicates that the first reference time has elapsed after initiating an operation of the compressor, and a determination result in the third determination step indicates that the state in which the degree of supercooling is the second reference temperature or lower is maintained for the second reference time or more.

11. The method of claim 8, wherein the second determination step is performed when the determination result in the first determination step indicates that the thermal management system operates in the battery thermal management mode, and wherein the third determination step is performed when a determination result in the second determination step indicates that the first reference time has elapsed after initiating the operation of the compressor.

12. The method of claim 8, further comprising:
 a compressor control step of restricting at least one of a maximum rotational speed and an increase/decrease rate of a rotational speed of the compressor when a determination result in the fourth determination step indicates that the current state is the low-refrigerant state.

13. The method of claim 8, further comprising:
 an alarm step of raising an alarm when a determination result in the fourth determination step indicates that the current state is the low-refrigerant state.

14. A compressor comprising:
 a motor configured to generate power;
 a rotary shaft configured to be rotated by the motor;
 an orbiting scroll configured to be rotated by the rotary shaft; and
 a fixed scroll defining a compression chamber together with the orbiting scroll, wherein the compressor includes a thermal management system comprising:
  a coolant circuit having a circulating coolant, and a battery heat exchanger configured to allow the coolant to exchange heat with a battery of a vehicle;
  a refrigerant circuit including a compressor configured to compress a refrigerant, a first heat exchanger configured to cool the refrigerant compressed by the compressor, an expansion means configured to expand the refrigerant cooled by the first heat exchanger, and a second heat exchanger configured to allow the refrigerant, which is expanded by the expansion means, to exchange heat with the coolant;
  a measurement means configured to measure a pressure and a temperature of the refrigerant; and
  a controller configured to determine whether a battery thermal management mode operates in which the coolant circuit and the refrigerant circuit are operated and operations of cooling and heating an interior of the vehicle do not operate, detect a degree of superheat or a degree of supercooling of the refrigerant from the pressure and the temperature of the refrigerant measured by the measurement means, and determine whether a current state is a low-refrigerant state in which a refrigerant amount in the compressor is smaller than a reference refrigerant amount.

\* \* \* \* \*